May 6, 1958 F. C. BAYER 2,833,602
SELF-CENTERING PISTON
Filed March 26, 1954 2 Sheets-Sheet 1
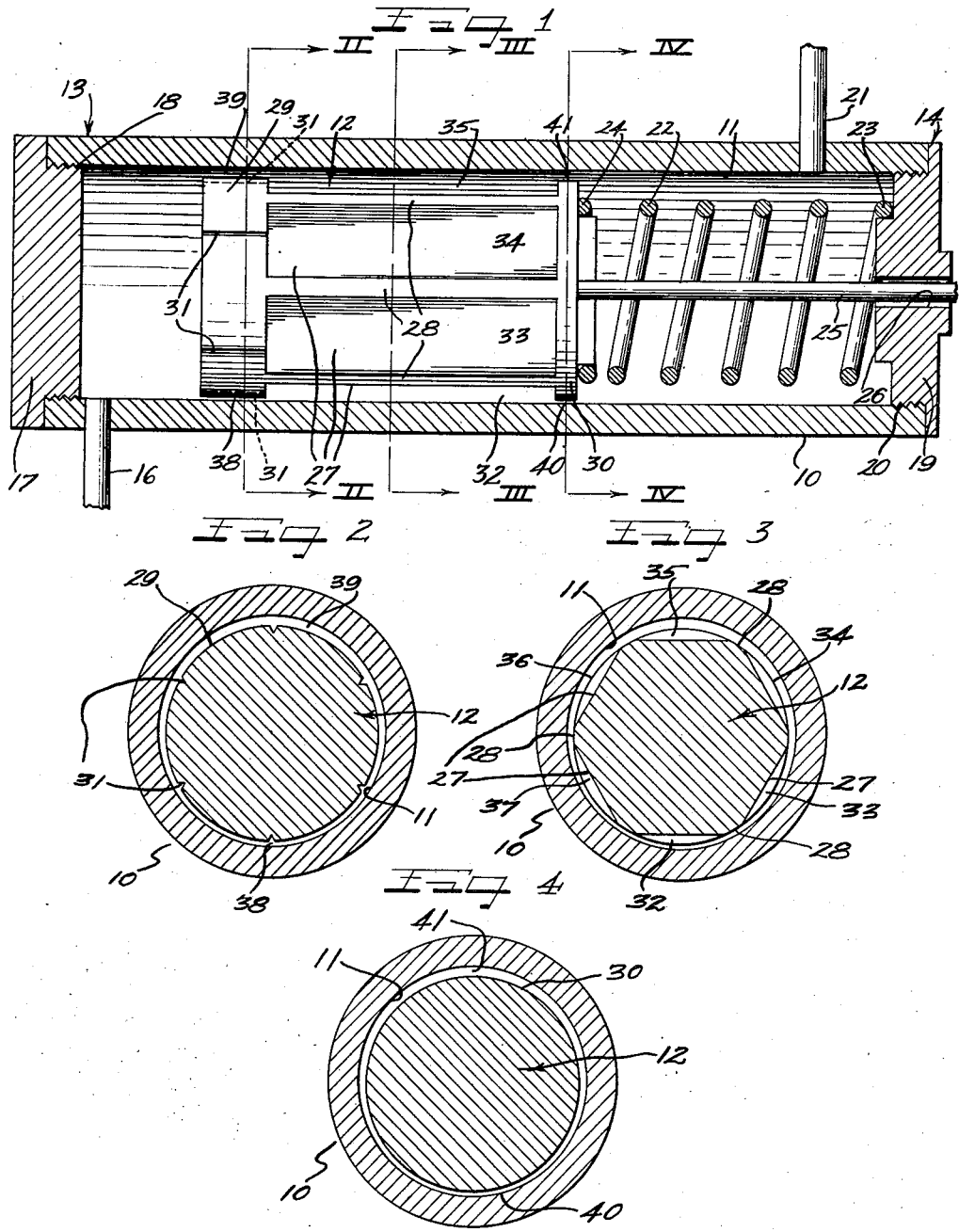
Inventor
Frank C. Bayer

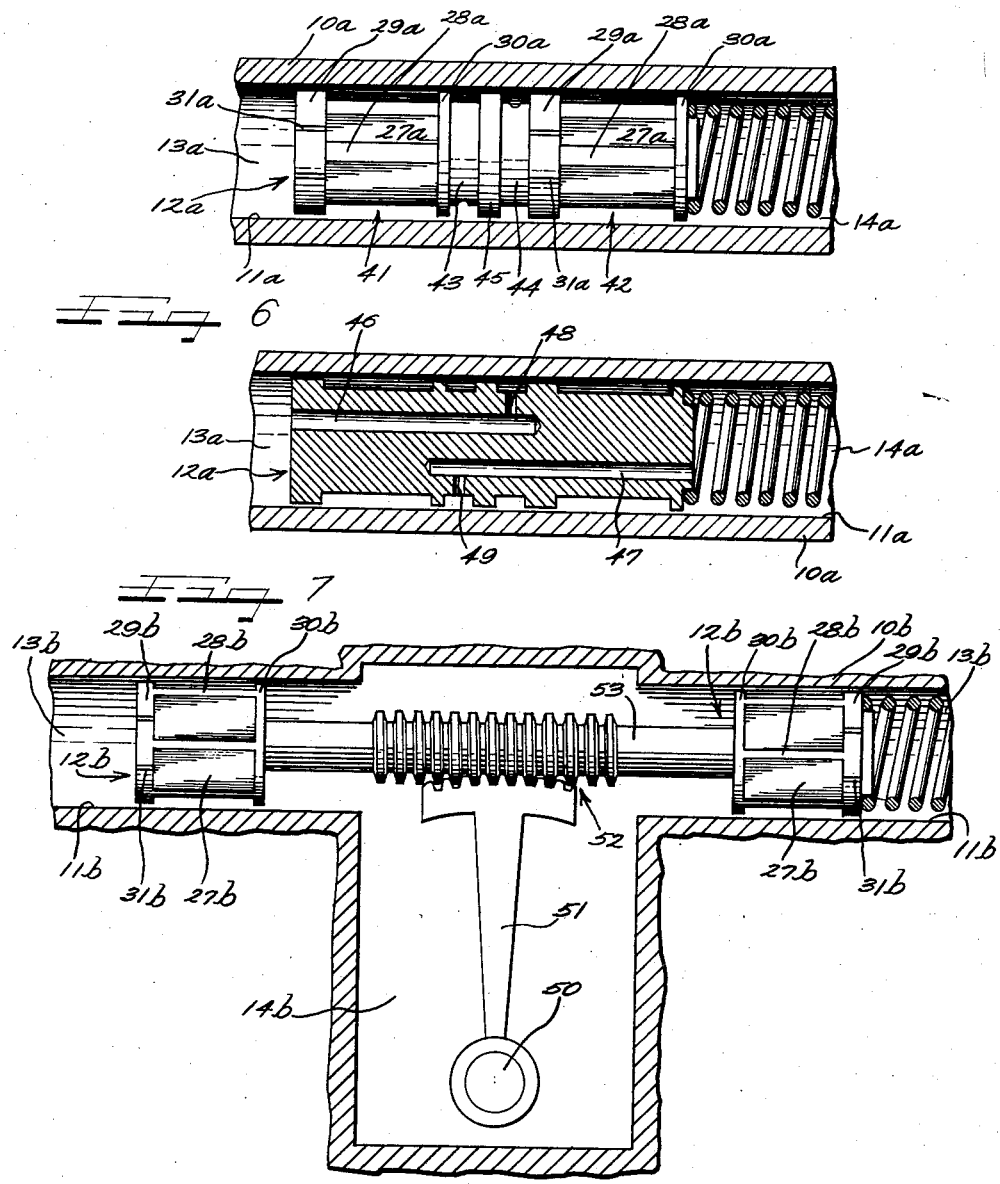

United States Patent Office 2,833,602
Patented May 6, 1958

2,833,602
SELF-CENTERING PISTON

Frank C. Bayer, Euclid, Ohio, assignor to Thompson Products, Inc., Cleveland, Ohio, a corporation of Ohio Application March 26, 1954, Serial No. 418,947

14 Claims. (Cl. 309—5)

The present invention relates to self-centering telescoped or nested parts and more particularly deals with a self-centering piston and sleeve assembly having minimized hysteresis losses.

In order to attain satisfactory performance in most fluid systems, such as hydraulic systems and pneumatic systems including liquid or gas fuel systems and numerous other types of systems, it is required that the valve components and the valve actuating components exhibit a minimum of "hysteresis." Hysteresis is generally the result of friction between moving parts, such as a piston within a sleeve or bore, and represents substantial losses and lagging or other features of improper response. Friction between such moving parts is due generally to one or more of such factors as (1) unbalanced fluid side loads along the clearances between the piston and sleeve, (2) mechanical side loads arising from springs, external loads on the piston or sleeve, and piston or sleeve weight, and (3) extremely small clearances and/or relatively poor surface finishes.

Although the prior art is replete with means which have been devised to minimize frictional forces in valving where hysteresis in one form or another is intolerable, these prior art means have not been fully successful. In many of the prior art devices it has been found that although one or two of the aforementioned causes for hysteresis may be avoided in any given system, the heretofore devised means have not accomplished avoidance of all of these listed causes. As an example, balance labyrinth type grooves in the piston or in the sleeve are employed to minimize fluid side loading but have not been sufficiently successful in avoiding the undesirable effects of mechanical side loads etc. Careful design of spring attachments and load application members along with piston and sleeve weight reduction will generally minimize hysteresis due to the mechanical loads as mentioned at (2) above. Further, extremely fine surface finishes and superior bearing materials have been found to reduce hysteresis arriving from each of these aforementioned factors, but they have not been found to reduce the factors as far as is desirable. All of the design details which are set forth in the examples here will reduce friction forces between moving parts, but metal to metal contact and the friction forces resulting from it will still be present in most cases and the costs of the attempts to reduce the friction forces do no generally seem justified because of their insufficient results.

In some cases it is feasible to rotate one member or the other thus eliminating static friction, but this method is not practicable in many components and generally increases the complexity and cost of design thereby rendering the same undesirable.

By the present invention, however, there is provided a piston and sleeve design which prevents metal to metal contact between the parts without the complexity and expense of the heretofore known means and which obviates the herein above described problems which existed in the art prior to the present invention.

In a piston and sleeve assembly embodying the principles of the present invention, the piston has several flats or recesses in the peripheral surface of the piston and which are separated from each other and which do not extend completely to either the high pressure end of the piston, which will be referred to hereinbelow as the head end of the piston, or to the low pressure end of the piston, which will be referred to as the rod end of the piston. The flats or recesses serve to form cavities between the piston and the sleeve when the piston, which otherwise has a peripheral contour conforming and corresponding to the inner peripheral contour of the sleeve, is assembled with the sleeve. A relatively wide land is located at the head end of the piston and a relatively narrow land is located at the rod end of the piston and both of these lands have substantially the same peripheral contour as the peripheral contour of the interior of the sleeve and are therefore peripherally complete and are effective to terminate the longitudinal ends of the flats or recesses in the cylinder body. Further, longitudinal grooves of relatively small cross-sectional area connect the flats or recesses with the high pressure area in the sleeve and thereby communicate each of the cavities with the high pressure chamber.

In operation, the lowermost cavity is substantially sealed by the lands and high pressure is admitted thereto through the groove in communication therewith. Due to the high pressure in the lowermost cavity, or in whatever cavity is in closest relation to the inner walls of the sleeve, pressure differentials exist which operate to self-center the piston within the sleeve or bore or cylinder with which it may be assembled. This pressure differential and self-centering operation maintains the piston substantially out of contact with the sleeve thereby permitting reciprocating motion without metal to metal contact and substantially without friction thereby reducing hysteresis and hysteresis losses to substantially zero value. Further, this self-centering operation in accordance with the principles of the present invention permits the use of inexpensive materials and otherwise poor bearing materials which still further need not have fine surface finishes.

It has also been found that in some instances the piston axis may tend to become askew to the axis of the sleeve or cylinder in which the piston is to reciprocate. This may occur from such unbalances as may be caused from gravitational forces or mechanical attachments such as springs and piston rods and the like or from hydraulic or pneumatic side loads causing unbalances and the like. In such instances the piston or piston assembly may be centered in accordance with the principles of the present invention by providing the system with a plurality of heads, such as one at each end thereof each having a self-centering relation with the sleeve so as to center each end of the piston within the sleeve or cylinder and thereby centering the entire piston assembly.

Such an arrangement is not limited to a single piston, of course, since it may be applied to a multiple piston assembly or the like such as may be used in reciprocal control devices, etc.

It is therefore an important object of the present invention to provide a self-centering piston and sleeve assembly wherein the head end and the rod end of the piston substantially conform to the inner peripheral contour of the sleeve and recesses are provided in the peripheral wall of the piston and grooves communicate each of the recesses with the sleeve head end chamber, whereby pressure differentials across the piston are effective to center the piston within the sleeve and permit reciprocation of the piston substantially without friction and substantially without hysteresis losses.

Still another object of the present invention is to provide a self-centering piston for a substantially friction free and hysteresis free piston and sleeve assembly wherein the piston has peripheral recesses in the side wall thereof and passages through the head end of the piston communicating each of the recesses with the head end chamber at the head end face of the piston.

Still another object of the present invention is to provide a new and improved self-centering piston for a substantially friction free and substantially hysteresis free piston and sleeve assembly wherein means are provided to center the piston in the sleeve by full pressure differentials.

Still another object of the present invention is to provide a new and improved cylinder and piston assembly for substantially friction free and substantially hysteresis free relative reciprocation wherein means are provided to individually center each end of the piston assembly within the cylinder or sleeve by radial pressure differentials at each end of the piston assembly.

Still other objects, features and advantages of the present invention will become readily apparent from the following detailed description of the present invention and a preferred embodiment thereof, from the accompanying drawings which fully and completely disclose each and every detail shown thereon, in which there is illustrated a preferred embodiment of the present invention, in which like reference numerals refer to like parts, and in which:

Figure 1 is a longitudinal and partially sectional view of a piston and sleeve assembly incorporating the principles of the present invention;

Figure 2 is a sectional view of the piston and sleeve assembly of Figure 1 and is taken substantially along the line II—II of Figure 1;

Figure 3 is a sectional view of the piston and sleeve assembly of Figure 1 and is taken substantially along the line III—III of Figure 1;

Figure 4 is still another sectional view of the piston and sleeve assembly of Figure 1 and is taken substantially along the line IV—IV of Figure 1;

Figure 5 is a longitudinal view partially in section and of a sleeve or cylinder and piston assembly constituting another embodiment of the present invention wherein the piston is arranged to have each end thereof centered in accordance with the principles of the present invention;

Figure 6 is a longitudinal full sectional view of the arrangement of Figure 5 showing further details of the piston assembly; and Figure 7 is a fragmental view partially in section and of a double-ended piston assembly arranged to be self-centered in a sleeve by centering each end thereof.

As shown on the drawings:

In the embodiment of the present invention illustrated in Figures 1 through 4 a sleeve 10 or the like, which may be a sleeve or a cylinder or a cylinder block or valve block or valve actuator block or the like, and which may be formed of any particular desired material but which is preferably formed of metal, has an axially extending bore or passage 11 therethrough. The passage 11 in the sleeve 10 has any desired, axially regular, peripheral contour but is preferably cylindrical as clearly illustrated in Figures 2, 3 and 4. A piston 12 is received in the bore 11 and is axially reciprocable therein between the head or cap end 13 of the sleeve 10 and the rod or biased end 14 of the cylinder. The head end or cap end 13 of the cylinder or sleeve 10 is also preferably the high pressure end thereof as high pressure fluid is admitted into the chamber between the cap end 13 of the cylinder and the piston 12 by an inlet conduit or pipe or tube 16 or the like which may be connected to the high pressure fluid reference source (not shown). The high pressure head end 13 of the cylinder or sleeve body 10 is preferably capped or the like as by a cap member 17 threaded onto and sealed against the sleeve body 10 as indicated generally at 18.

The low pressure or rod end 14 of the sleeve 10 may also be capped or the like as by cap member 19 which is threaded or the like and sealed to the sleeve 10 as indicated generally at 20. A conduit or tube or pipe 21 or the like admits low pressure fluid to the chamber which is confined by the sleeve 10 and the cap 19 and piston 12. The conduit or tube or pipe or the like 21 admits the low pressure fluid from the low pressure reference source (not shown).

Assuming that the tubes 16 and 21 are connected to high pressure and low pressure reference sources respectively, in many preferred embodiments the low pressure end of the piston 12 will be biased towards the high pressure chamber by a biasing spring 22 or the like which has one end 23 thereof seated against the low pressure cap 19, while the other end 24 of the spring 22 is seated against the piston 12 to bias the piston in a direction of movement toward the high pressure chamber. The rod 25 may be connected to either end of the piston 12 for axial reciprocation therewith, but in this preferred embodiment of the present invention it is securely coupled to the low pressure end or face of the piston 12 and is axially reciprocable through an appropriate aperture 26 in the rod end or low pressure end cap 19.

When a pressure differential exists across the cylinder 12 between the high pressure and low pressure ends thereof the piston 12 will be moved in an appropriate direction to compensate for the pressure differential thereacross and will reciprocally carry the rod 25 therewith to actuate whatever device is to be moved or actuated by the pressure sensitive movement of the piston 12.

The piston 12, however, in accordance with the principles of the present invention, is operable to reciprocate axially within the sleeve 10 substantially without friction and substantially without hysteresis or hysteresis losses. To effect this substantially friction free movement of the piston 12 within the cylinder or sleeve 10, the piston 12 is provided with a plurality of radially disposed axially extending flats or recesses or the like 27 which are circumferentially separated by piston wall marginal portions 28. That is, the flats or recesses 27 in the circumferential walls of the piston 12 are circumferentially spaced thereabout and are separated by unrecessed portions of the circumferential wall of the piston 12 which are marginal portions for each of the recesses 27, as indicated at 28.

Further, the recesses or flats 27 extend less than the full axial length of the piston 12 thereby providing lands at the head end 29 and the rod end 30 of the piston. These lands 29 and 30 each have peripheral contours substantially conforming to the peripheral contour of the interior bore 11 of the sleeve 10, and in the instance of the present embodiment of this invention are circular in cross-section as indicated in Figures 2 and 4. The head end land 29 also preferably has a width or axial length substantially greater than the width or axial length of the rod end land 30. In addition, grooves 31 or the like recessed across the head end land 29 and extend axially thereof, communicate each of the recesses 27 with the high pressure chamber at the head or cap end of the cylinder. It will also be observed from Figures 2 and 4 that although the head land and rod land on the piston 12 have peripheral contours which are substantially the same as the inner peripheral contour of the bore 11 in the sleeve 10, their dimensions are slightly smaller than the dimensions of the bore 11. By reducing the dimensions of the piston 12 there is provided a free working clearance from the walls of the bore 11 and further there is permitted operation in accordance with the principles of the present invention as described in detail hereinbelow.

*The operation of the assembly of Figures 1–4*

The recesses or flats 27 in the side wall of the piston 12 are operable, together with the inner walls of the bore or the like 11, to form cavities peripherally disposed about the piston 12 and equal in number to the flats or recesses 27 as indicated at 32, 33, 34, 35, and 36 and 37 in Figure 3. The number of flats or recesses 27 and the number of cavities 32 through 37 are not critical but they should be sufficient in number to permit operation in accordance with the principles of the present invention. In this embodiment of the present invention, six such flats or recesses and cavities have been shown.

Each of the cavities 32 through 37 is communicated with the high pressure chamber at the head end or cap end of the sleeve by the relatively small grooves 31 longitudinally recessed in the surface of the head end land 29. Since the piston has at least working clearance with the walls of the bore 11 there are clearances between the head end land and the bore walls, and the rod end land and the bore walls. The clearances at the head end land 29 and adjacent to the cavities 32 and 35 are indicated at 38 and 39; the clearances about the rod end land 30 and respectively adjacent to the cavities 32 and 35 are indicated at 40 and 41.

During normal operation of the piston and sleeve assembly or when the piston is at rest with respect to the sleeve, irrespective of the general placement and disposition of the assembly, the piston 12 will have a tendency to approach or lie against a portion of the walls of the bore 11. Assuming that the assembly is horizontally disposed as illustrated, the piston will have a tendency to lie against the bottom portion of the sleeve bore 11 walls. While in such a position the clearances 38 and 40 will be reduced to a point where there may be metal to metal contact between the lands 29 and 30 and the lower portion of the walls of the bore 11. At the same time, the clearances 39 and 41 will be increased, possibly to the maximum possible clearance. Under such conditions, the cavity 32 will be effectively sealed except for the high pressure communication groove 31 which admits high pressure fluid thereto and raises the pressure in the cavity to approach the pressure of the high pressure fluid.

Leakage flow from the high pressure chamber to the low pressure chamber through the clearances 39 and 41 and through the cavity 35 results in a pressure drop across the relatively wide land 29 and a second pressure drop across the relatively narrow land 30. (It is preferred that the high pressure land 29 be substantially wider, axially, than the low pressure land 30.) Since each of the grooves 31 is of relatively small cross sectional area, they add little to the leakage flow area through the clearances 39 and 41. The leakage flow through the clearances 39 and 41 are approximately equal. The pressure drop across the clearance 39, however, is considerably greater than the pressure drop across the clearance 41 as a result of the longer length of the clearance passage at 39. The pressure in the upper cavity 35 therefore approaches the pressure at the low pressure end of the piston.

As a result of the pressures existing in the cavities 32 and 35, a centering force is developed which is equal to the difference in these pressures times the effective area of the cavity. The remaining cavities 33 and 37 also have pressures which are higher than the cavities 34 and 36 and therefore also contribute some additional forces in a similar manner. These forces substantially prevent contact between the piston and the sleeve and the piston is maintained in a substantially concentric position in the sleeve since these forces are effective centering forces.

It will also be observed that through the action of these centering forces the piston is maintained operatively substantially out of contact with the walls of the bore 11 and therefore permit substantially hysteresis free and substantially friction free control reciprocation of the piston within the cylinder.

In Figures 5 and 6 there is shown an assembly embodying the principles of the present invention and operable to center the piston 12a within the bore 11a of the cylinder or sleeve 10a, by centering each end thereof to fully effectively counteract any forces which may tend to dispose the axis of the piston askew with respect to the axis of the sleeve bore 11a. In this embodiment of the present invention the piston 12a is comprised of a pair of axially spaced piston sections 41 and 42 each of which is preferably substantially the same as the piston 12 of the embodiment of Figures 1 through 4. That is, each of the piston sections 41 and 42 is provided with a wide land or high pressure end land 29a and a narrow land or low pressure end land 30a such that the high pressure wide land 29a is adjacent to the high pressure end 13a of the sleeve cavity and so that the narrow low pressure end land 30a of the other piston section 42 is at the low pressure cavity 14a of the sleeve 10a.

In addition, of course, the body portion of each of the piston sections between the high pressure lands and the low pressure lands thereof, respectively, are provided with flats or grooves or recesses 27a or the like separated by longitudinally arranged full radius sections 28a so that the flats or recesses 27a define pressure confining cavities circumferentially about the piston sections with the bore wall of the sleeve.

Between the low pressure flange or land 30a of the section 41 and the high pressure flange or land 29a of the section 42, however, the piston 12a is provided with a pair of peripheral recesses 43 and 44 separated by a full diameter flange-like section 45.

In Figure 6 it may be seen that a pair of longitudinally extending bores 46 and 47 extending from the high pressure end 13a and the low pressure end 14a of the sleeve cavity, respectively, communicate with radial bores 48 and 49, respectively, to vent high pressure fluid to the peripheral recess 44 adjacent to the high pressure land 29a of the section 42, and vent low pressure fluid to the peripheral recess 43 adjacent to the low pressure flange or land 30a of the section 41 of the piston 12a.

Grooves 31a longitudinally recessed in and extending across the high pressure lands 29a vent high pressure to each of the recesses or flats or the like 27a in piston sections 41 and 42 so that each section 41 and 42 will be self-centered in the manner described hereinabove for self-centering of the entire piston of the assembly of Figures 1 through 4. It will be observed, however, that in this embodiment of the present invention should there be any existing forces tending to dispose the axis of the piston 12a askew with respect of the axis of the sleeve 10a, those forces will be counteracted since the self-centering action of the piston is operative to center each end thereof and thus center the entire piston irrespective of those aforementioned askew forces.

These same principles operable to self-center a piston even though various unbalanced radial forces may be acting on the same, are embodied in the assembly illustrated in Figure 7. In this embodiment which is mechanically arranged to controllably rotate or oscillate a shaft or the like 50 which has an arm 51 secured thereto and geared in a convenient manner as by a gear and worm or gear and rack or the like 52, to a piston shaft 53 having piston heads 12b at each end thereof and axially slidably arranged in a cylinder or sleeve arrangement 10b having a cylinder or sleeve bore 11b therein. This mechanical movement is arranged for the pistons and sleeve to be axially moved in accordance with the differential pressures between normally substantially equal fluid pressure chambers and high pressure chambers 13b. The chamber 14b between the pistons 12b and surrounding the shaft 53 and the gear coupling 52, the arm 51 and the shaft 50 is a vented low pressure chamber so that there is a pressure drop across each of the pistons 12b. Each of the pistons 12b is preferably substantially similar to the piston 12 of Figures 1 through 4 and is provided with a high pressure end land 29b and a low pressure end land 30b between which each of the pistons is provided with longitudinally extending flats or recesses 27b which are peripherally separated by full diameter lands 28b. Further, the diametrically opposed high pressure lands 29b are provided with high pressure venting grooves 31b to vent high pressure to the cavities formed between the recesses 27b and the cylinder or sleeve walls 11b.

The mode of operation for self-centering each of the piston heads 12b is substantially the same as that described hereinabove with regard to the assembly of Figures 1 through 4 and the assembly of Figures 5 and 6 so that in operation each of the piston head sections will be centered within the sleeve bore 11b for substantially friction free and hysteresis free oscillation and further so that any forces tending to dispose the axis of the pistons and the shafts askew with respect to the axis of the sleeve will be fully counteracted.

Thus, embodiments of the present invention utilize and develop centering forces which prevent metal to metal contact between the piston and the sleeve. Without metal contact mechanical friction and its resulting hysteresis effects are eliminated. In addition to eliminating mechanical friction, other advantages are obtained from the principles of the present invention. For a given dimensional clearance between piston and sleeve, leakage is significantly reduced by maintaining the piston substantially concentric with the sleeve. Conjugately, for a given maximum allowable leakage, dimensional clearance or tolerance can be increased. Surface finish is less critical in assemblies utilizing the principles of the present invention and relatively poor bearing materials may be employed without the normally attending losses from their use. Further, wear on the piston and sleeves is substantially reduced.

It also will be observed that by the principles of the present invention I have provided a new and improved piston and piston sleeve assembly which is of general application and particularly has advantages for utilization in hydraulic and pneumatic systems generally and valve and valve actuator components specifically as well as in compressor pistons, pump pistons, pressure gauges, and actuating cylinders, etc., where hysteresis, leakage, wear and manufacturing problems may be eliminated.

It will be understood, of course, that numerous modifications and variations may be made without departing from the true spirit and scope of the novel concepts and the principles of the present invention. I, therefore, intend to cover all such modifications and variations as fall within the true spirit and scope and novel concepts and principles of my invention.

I claim as my invention:

1. In an assembly of the class described, a sleeve, a piston reciprocably arranged in said sleeve, a first end wall on said piston limiting a high pressure chamber in said sleeve, a second end wall on said piston limiting a low pressure chamber in said sleeve, a peripheral wall on said piston having a plurality of peripherally spaced recesses therein disposed to form a relatively wide land adjacent to said first end wall and a relatively narrow land adjacent to said second end wall, and a plurality of axial grooves in the relatively wide land communicating the high pressure chamber with each of said recesses respectively, whereby the piston is self-centering in said sleeve and substantially friction free and hysteresis free reciprocable within said sleeve.

2. In an assembly of the class described, a sleeve, a piston reciprocably arranged in said sleeve, a first end wall on said piston limiting a high pressure chamber in said sleeve, a second end wall on said piston limiting a low pressure chamber in said sleeve, a peripheral wall on said piston, a plurality of circumferentially spaced cavities between said peripheral wall and said sleeve, said cavities extending less than the axial length of said piston and axially disposed more closely adjacent to said second end wall than to said first end wall, and passages communicating the high pressure chamber with each of said cavities respectively whereby said piston is self-centering in said sleeve and substantially friction free and hysteresis free reciprocable with said sleeve.

3. In piston and sleeve assembly where the piston separates a high pressure chamber and a low pressure chamber within the sleeve and is reciprocable within the sleeve, a plurality of peripherally disposed cavities between piston and the sleeve, first pressure dropping means between the high pressure chamber and said cavities, and second pressure dropping means between the low pressure chamber and said cavities, said first pressure dropping means being operable to have a greater pressure drop thereacross than said second pressure dropping means.

4. In piston and sleeve assembly where the piston separates a high pressure chamber and a low pressure chamber within the sleeve and is reciprocable within the sleeve, a plurality of peripherally disposed cavities between piston and the sleeve, first pressure dropping means between the high pressure chamber and said cavities, and second pressure dropping means between the low pressure chamber and said cavities, said first pressure dropping means being operable to have a greater pressure drop thereacross than said second pressure dropping means, and further means to communicate each of said cavities with the high pressure chamber.

5. In a self-centering substantially friction free piston and sleeve assembly where the piston separates a high pressure chamber and a low pressure chamber and operable substantially without hysteresis losses a, piston having an end wall and a side wall, a plurality of peripherally disposed recesses in the side wall of said piston, and a fluid pressure passage communicating said recess with the end of said piston.

6. In a self-centering substantially friction free piston and sleeve assembly where the piston separates a high pressure chamber and a low pressure chamber and operable substantially without hysteresis losses, a piston having ends configurated to conform to the inner peripheral contour of a sleeve in which said piston is to be disposed for reciprocation, a plurality of peripherally disposed recesses in a side wall of said piston, said recesses having a lesser dimension axially of said piston than the axial dimension of said piston, and a fluid pressure passage communicating said recesses with the end of said piston.

7. In a self-centering substantially friction free piston and sleeve assembly operable substantially without hysteresis losses, a piston having ends configurated to conform to the inner peripheral contour of a sleeve in which said piston is to be disposed for reciprocation, a plurality of peripherally disposed recesses in a side wall of said piston, said recesses having a lesser dimension axially of said piston than the axial dimension of said piston, and a fluid pressure passage communicating each of said recesses with the end of said piston.

8. A piston for substantially friction free reciprocation in a sleeve or the like where the piston separates a high pressure chamber and a low pressure chamber, comprising, a piston body, a plurality of peripherally disposed recesses in said piston body, a land limiting said recesses at one end of said piston body, and a land limiting said recesses at the other end of said piston body, said recesses having a width less than the peripheral dimension of said piston body.

9. A piston for substantially friction free reciprocation in a sleeve or the like, comprising a piston body, a plurality of peripherally disposed recesses in said piston body, a land limiting said recesses at one end of said piston body, and a relatively wider land limiting said recesses at the other end of said piston body, and passages extending from said other end of the piston body to each of said recesses.

10. A piston for substantially friction free reciprocation in a sleeve or the like, comprising, a piston body, end walls and a peripheral side wall on said piston body, a plurality of axially extending and circumferentially disposed and separated recesses in the side wall, said recesses having an axial dimension less than the axial dimension of the piston body with one end of each of said recesses disposed more closely adjacent to one end wall of said piston body than the other end of each of said recesses is to the other end wall of the piston body, and passages in said piston extending from said recesses respectively to said other end wall of said piston.

11. In combination, loosely telescoped inner and outer parts separating high and low pressure zones in the outer part, said parts having confronting walls defining localized chambers around the periphery of the inner part, bleed means venting the chambers to said zones, some of said chambers having freer communication with the low pressure zone than other chambers in response to unsymmetrical seating of the parts, whereby pressure in the higher pressured chambers will be effective to center the parts and thereby establish equilibrium pressures in all the chambers.

12. In combination, inner and outer parts in loose telescoped relation, said parts having confronting walls defining localized chambers around the periphery of the inner member, and means for bleeding fluid under pressure into and out of said chambers whereby unsymmetric seating of the loose parts will vent some chambers more than others to reduce the fluid pressure therein, whereby the higher pressure in the other chambers will center the parts and thereby establish equal pressures in the chambers.

13. In a piston and sleeve assembly wherein the piston and sleeve are relatively reciprocably arranged and operable in response to fluid pressure differences across said piston within said sleeve, recessed wall portions defining radially separated circumferentially arranged cavities between the piston and the sleeve, means to vent said cavities to a relatively high fluid pressure in said sleeve, and means to vent said cavities to a relatively low fluid pressure in said sleeve, said low pressure venting means having varying venting capacity in accordance with misalignment of the piston axis and the sleeve axis whereby fluid pressure in said cavities will vary to center the piston in the sleeve.

14. In a piston and sleeve assembly wherein the piston and sleeve are relatively reciprocably arranged and operable in response to fluid pressure differences across said piston within said sleeve, recessed wall portions defining groups of radially separated circumferentially arranged cavities between the piston and the sleeve adjacent each end of the piston, means to vent said cavities of each group to a relatively high fluid pressure in said sleeve, and means to vent said cavities of each group to a relatively low fluid pressure in said sleeve, said low pressure venting means having varying venting capacity in accordance with misalignment of the piston and the sleeve axis whereby the fluid pressure in said cavities will vary to center the piston in the sleeve by centering each end of the piston.

References Cited in the file of this patent
UNITED STATES PATENTS

| | | |
|---|---|---|
| 1,798,399 | Clark | Mar. 31, 1931 |
| 2,623,501 | Audemar | Dec. 30, 1952 |